United States Patent
Tanaka et al.

[11] Patent Number: 6,107,376
[45] Date of Patent: Aug. 22, 2000

[54] ACRYLIC RUBBER COMPOSITION

[75] Inventors: Norio Tanaka, Handa; Tokuhide Aoyama, Nagoya, both of Japan

[73] Assignee: Denso Corporation, Kariya, Japan

[21] Appl. No.: 08/743,033

[22] Filed: Nov. 4, 1996

[30] Foreign Application Priority Data

Nov. 6, 1995 [JP] Japan ................................ 7-287598

[51] Int. Cl.⁷ .................................................. C08K 5/51
[52] U.S. Cl. ........................ 524/153; 524/115; 524/147; 524/151
[58] Field of Search .................. 524/153, 115, 524/147, 151

[56] References Cited

U.S. PATENT DOCUMENTS

| | | | |
|---|---|---|---|
| 4,727,104 | 2/1988 | Wehner et al. | 524/153 |
| 4,824,905 | 4/1989 | Saeki et al. | 525/66 |
| 5,362,592 | 11/1994 | Murofushi et al. | 430/106 |

FOREIGN PATENT DOCUMENTS

| | | | |
|---|---|---|---|
| 2047274 | 1/1992 | Canada | 524/153 |
| 2067258 | 12/1992 | Canada | 524/153 |
| 0510666A1 | 10/1992 | European Pat. Off. | |
| 2444671 | 3/1975 | Germany | 524/153 |
| 4343057A1 | 6/1994 | Germany . | |
| 59-1565 | 1/1984 | Japan . | |
| 2143977 | 6/1987 | Japan | 524/153 |
| 5-148476 | 6/1993 | Japan . | |
| 6-157826 | 8/1994 | Japan . | |

OTHER PUBLICATIONS

Derwent Publications Ltd., London, GB; AN 94–222112 & JP–A–06 157 826 (Nippon Gosei Gomu) *Abstract*.

Derwent Publications Ltd., London, GB; An 96–124197 & JP–A–08 020 702 (Gomu No Inaki, Nippondenso) *Abstract*.

*Primary Examiner*—Judy M. Reddick
*Attorney, Agent, or Firm*—Pillsbury Madison & Sutro LLP

[57] ABSTRACT

An acrylic rubber composition which forms a phosphorous inert coating on the surface of a metal member when in contact with the metal member under high temperature contains the acrylic rubber, a phosphite-based material and an acid acceptor which reacts with an acid substance in the composition. The acrylic rubber composition particularly exhibits its effect when used as a sealing member 10 for an oil filter 1 which filters engine oil. In such cases, the content of the phosphite-based material is preferably 8–20 parts by weight and that of the acid acceptor is preferably 1–10 parts by weight to 100 parts by weight of the acrylic rubber.

3 Claims, 1 Drawing Sheet

ACRYLIC RUBBER COMPOSITION

BACKGROUND OF THE INVENTION

1. Field of the Invention

The present invention relates to an acrylic rubber composition which is suitable for use as a sealing member while in contact with metal in automobile-mounted engine oil filters, distributors and the like.

2. Description of the Related Art

The problem of sticking between metal members and rubber members, after long-term contact of the metal members with the acrylic rubber compositions, has been addressed by subjecting the molded rubber members to post-treatment to form anti-stick coatings on the rubber member surfaces. Such an approach is described in Japanese Unexamined Patent Publication No. 5-148476. Since the step of forming the anti-stick coatings must be performed separately, manufacturing costs for such rubber members has increased.

Japanese Unexamined Patent Publication No. 6-157826 (published Jun. 7, 1994) discloses an acrylic rubber composition to be used as a metal-contacting member. The composition is prepared by combining an acrylic rubber with chromium, manganese, iron, cobalt, nickel, copper, zinc, aluminum, tin, lead, tellurium or a metal compound thereof, or with at least one type of phosphorus compound. This phosphorus compound helps prevent the rubber from sticking to contacted metals and protects the metals from corrosion. The phosphorus compounds can include inorganic compounds such as phosphoric anhydride and tris(nonylphenyl) phosphite, etc.

According to this document, at high temperatures, the acrylic rubber composition generates acidic substances such as hydrochloric acid or carboxylic acid. These acidic substances dissolve the poorly reactive iron oxide (black rust) which has usually formed on the surface of the metal member. Once the iron oxide has been dissolved, the highly reactive iron on the surface of the metal member is exposed. When this occurs, the surface of the metal member reacts with the phosphorus compound in the acrylic rubber composition, thus forming a phosphorus inert (poorly reactive) coating on the surface of the metal member. This inert coating is believed to prevent sticking between the acrylic rubber composition and the metal member.

However, upon close examination of this reaction, the present inventors have found that the anti-sticking effect of the phosphorus inert coating tends to be reduced when the acrylic rubber composition and the metal member are in contact for long periods of time. Upon long-term use, the acidic substances generated from the acrylic rubber composition, particularly highly oxidizing hydrochloric acid, damage the phosphorus inert coating formed on the surface of the metal member. As this coating deteriorates, the anti-sticking effect between the acrylic rubber composition and the metal member is reduced.

In light of these circumstances, it is an object of the present invention to obtain an acrylic rubber composition which effectively prevents damage to phosphorus inert coatings formed on the surface of metal members.

SUMMARY OF THE INVENTION

The present invention is the result of concentrated attention to the fact that after long-term use of acrylic rubber compositions which form phosphorus inert coatings on the surface of metal members when in contact with the metal members under high temperatures, those coatings become damaged. The present invention consists of an acrylic rubber composition which forms a phosphorus inert coating on the surface of a metal member when in contact with the metal member under high temperatures, wherein the acrylic rubber composition contains an acrylic rubber, a phosphite-based material, and an acid acceptor which reacts with an acid substance.

This acrylic rubber composition is suitable for use as a sealing material or sealing agent which comes in contact with metal members.

The present invention also provides a process for producing the above-mentioned acrylic rubber composition. This process consists of a step of mixing a non-crosslinked acrylic rubber, a phosphite-based material (phosphorus acid-based material) and an Acid acceptor, and a step of vulcanizing the rubber composition of the mixed non-crosslinked acrylic rubber, phosphite-based material and acid acceptor.

DESCRIPTION OF THE INVENTION

Specifically, according to the present invention, it is possible to form a phosphorous inert coating on the surface of a metal member by contacting the above-mentioned acrylic rubber composition with the metal member at high temperatures. This contact induces a chemical reaction between the phosphite-based material in the acrylic rubber composition and the surface of the metal member. The inert coating prevents sticking between the acrylic rubber composition and the metal member.

Furthermore, the acid acceptor reacts with acidic substances (hydrochloric acid, carboxylic acids, etc.) generated during the production process of the acrylic rubber composition and during its use at high temperatures. Since the acid acceptor thus inhibits the acid function of the acidic substances, there is less risk of damage to the above-mentioned phosphorus inert coating by the acidic substances. Therefore the inert coating can exist stably on the surface of the metal member even after long-term use. As a result, the acrylic rubber composition does not stick to the metal member even after a long period of use at high temperatures.

In other words, the present invention is characterized in that an acid acceptor is added to an acrylic rubber composition. This acrylic rubber composition forms a phosphorus inert coating on the surface of a metal member when it comes into contact with the metal member at high temperatures. The acid acceptor then effectively prevents damage to the inert coating formed on the surface of the metal member. The present invention, consequently, provides an even greater improvement in the anti-sticking effect of the acrylic rubber composition.

The acrylic rubber used in the present invention may be any chlorine-containing acrylic rubber.

Also, the phosphite-based material used in the present invention may be any one or more selected from tris-nonylphenyl phosphite, diphenylisooctyl phosphite and phenyldiisooctyl phosphite.

The acid acceptor used in the present invention may be any one selected from imide compounds (dicylcohexyl carbodiimide, etc.), epoxy compounds (aliphatic epoxy compounds such as 1,2-butyleneoxide, etc., aromatic epoxy compounds, high molecular epoxy compounds), amine compounds (dibutylamine, etc.) alcohols (octanol, dodecanol, etc.) glycols (triethylene glycol, etc.) and the like. The acid acceptor preferably contains no metal atoms in the molecule, as in the case of those compounds mentioned above. This minimizes an increase in the sticking force between the acrylic rubber composition and metal member due to metal atoms.

Also, the acrylic rubber composition according to the present invention preferably contains a phosphite-based material in an amount of 4–20 parts by weight to 100 parts by weight of the acrylic rubber.

This is because a reliable anti-sticking effect cannot be obtained when the amount of phosphite-based material is less than 4 parts by weight, since an insufficient amount of the phosphorus inert coating will be formed on the metal member surface. On the other hand, if the amount of phosphite-based material is greater than 20 parts by weight, crosslinking of the rubber component is inhibited during production of the acrylic rubber composition (described below). This inhibition results in poor physical characteristics, such as increased compression set and lower hardness of the acrylic rubber composition.

The acrylic rubber composition of the invention also preferably contains an amount of the acid acceptor of 0.1–20 parts by weight to 100 parts by weight of the acrylic rubber.

If the amount of the acid acceptor is less than 0.1 parts by weight, the acid function of the aforementioned acidic substance cannot be reliably inhibited. On the other hand, if the amount of the acid acceptor is more than 20 parts by weight, poorer physical characteristics, such as increased compression set and lower hardness of the acrylic rubber composition, will result.

In particular, acrylic rubber compositions used under high temperatures which come in contact with metal members composed of iron-based materials preferably contain an amount of the phosphite-based material of 8–20 parts by weight and an amount of the acid acceptor of 1–10 parts by weight to 100 parts by weight of the acrylic rubber. Within these ranges, an excellent anti-sticking effect can be expected. A sufficient anti-sticking effect is exhibited even against metal members composed of iron-based materials which especially tend to stick to acrylic rubber compositions. It is also possible to further minimize poor characteristics such as lower hardness of the acrylic rubber composition.

Iron-based materials are commonly used as materials for automobile engine peripheral parts. Sticking between iron-based metal members with conventional acrylic rubber compositions results in such problems as fracturing of parts of the acrylic rubber composition and the leaving of residue on the surface of the metal material when the acrylic rubber composition is removed from the metal member. However, the acrylic rubber composition of the present invention is able to effectively eliminate these problems. More preferably, the range of the phosphite-based material is 10–18 parts by weight to 100 parts by weight of the acrylic rubber.

The acrylic rubber composition of the present invention is prepared by mixing a non-crosslinked acrylic rubber, phosphite-based material and acid acceptor to make a rubber molding stock, and then crosslinking the rubber molding stock by vulcanization to increase the elasticity and strength of the rubber molding stock. During the vulcanization, various additives are added to the rubber molding stock, such as reinforcers (e.g., carbon black), vulcanizing agent (e.g. 2,4,6-trimercapto-S-triazine) and vulcanizing co-agent (e.g. stearic acid, zinc dibutyldicarbamate).

EXAMPLES

Figure 1:
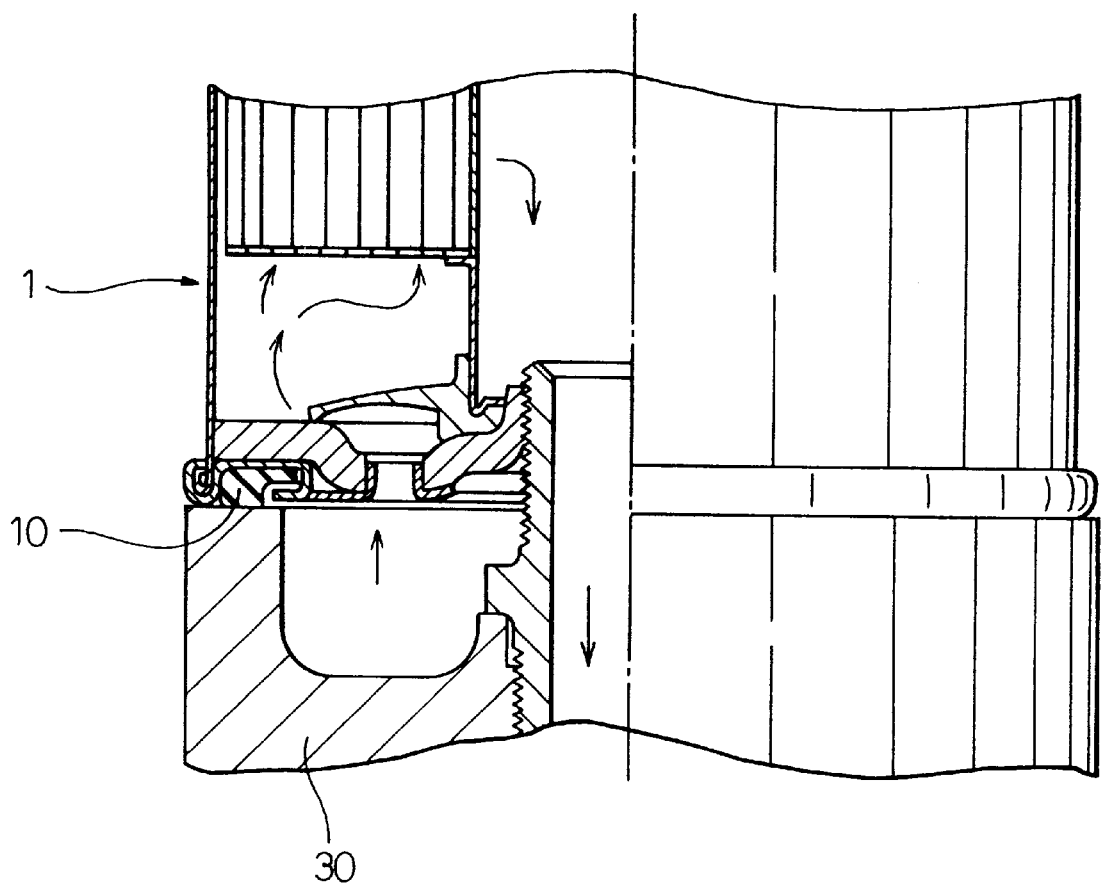
FIG. 1 is a partial cross-sectional view of an oil filter.

As shown in FIG. 1, the acrylic rubber composition of the present invention may be applied as a sealing member 10 for an automobile engine oil filter 1. The sealing member 10 is ring-shaped and is held compressed between the oil filter 1 and an iron engine block 30. The specific structure of the oil filter 1 and engine block 30 are publicly known and their explanation is therefore omitted. Here, the sealing member 10 of the oil filter 1 is in the high temperature environment (about 120° C.) of the area around the engine, and is also in direct contact with engine oil (at about 100° C.) The oil filter 1 is an essential part which must be periodically replaced.

Nevertheless, since the sealing member 10 is formed of the above-mentioned acrylic rubber composition, sticking to the engine block 30 is prevented over long periods.

Consequently, since residue of fragments of the sealing member 10 stuck to the engine block during replacement of the oild filter is avoided, the oil filter 1 replacement operation is facilitated.

The production process for the acrylic rubber compositions of Examples 1 to 8 will now be described.

A kneader and roller were used to knead 100 parts by weight of a chlorine-containing acrylic rubber (Japan Synthetic Rubber AREX 411) as the acrylic rubber, 100 parts by weight of carbon black (ASTM N774) as a reinforcer, 0.8 part by weight of 2,4,6-trimercapto-S-triazine as a vulcanizing agent, 1 part by weight of stearic acid as a vulcanizing aid, 2 parts by weight of zinc dibutyldicarbamate and 2 parts by weight of the diphenylamine-based antioxidant (4,4'-(α, α-dimethylbenzene) diphenylamine) as vulcanizing aids, a phosphite-based material (tris-nonylphenylphosphite) in the amounts shown in Tables 1 and 2 to form the inert coating, and an acid acceptor (dicyclohexyl carbodiimide) which characterizes this invention, in the amounts shown in Tables 1 and 2, to thus prepare a rubber molding stock.

The rubber molding stock is then vulcanized for crosslinking, to increase the elasticity and strength of the rubber component. The vulcanization is first carried out by press vulcanization at 180° C. for 20 minutes. Then a secondary vulcanization is carried out at 175° C. for 4 hours. This yields an acrylic rubber composition according to the invention which consists of a cylindrical mold 29 mm in diameter and 12.7 mm in height.

Examples 1–3

Comparative Example 1

The anti-sticking effect by addition of the phosphite-based material in Examples 1–3 in comparison to Comparative Example 1 is evaluated in Table 1, and is discussed in detail below.

To each of the acrylic rubber compositions in Examples 1–3 there was added 10 parts by weight of the acid acceptor. 5 parts by weight of the phosphite-based material was added to Example 1. 10 parts by weight of the phosphite-based material was added to Example 2. 20 parts by weight of the phosphite-based material was added to Example 3. An acrylic rubber composition containing no phosphite-based material was also molded for Comparative Example 1, according to the same production method described above.

A sample of each of the above-mentioned acrylic rubber compositions was sandwiched between 2 soft-iron plates (cold-rolled steel plate SPCC), and the acrylic rubber composition was held between the 2 pieces of 2 mm-thick soft-iron plates with clamping bolts at a compression to 25% of the full thickness. Each of the acrylic rubber compositions compressed with the soft-iron plates was then directly immersed in engine oil at 140° C. for 100 hours. After they were taken out, the clamping bolts were removed to relieve the compression. Then, while each acrylic rubber composition was left sandwiched between the 2 soft-iron plates with no compression, the 2 soft-iron plates were subjected to a tension tester (Shimazu Seisakusho: AGS-500).

Then, one of the soft-iron plates was anchored while the other soft-iron plate was pulled in the axial direction of the acrylic rubber composition at a rate of 20 mm/min, to measure the peeling load. This value is shown in Table 1 as the sticking force between the soft-iron plates and each acrylic rubber composition. In Table 1, sticking forces of less than 0.5 (kgf) are sticking forces so low that measurement was impossible to take with the tension tester, and it was confirmed that no fracture of the acrylic rubber compositions occurred.

Table 1 shows that the sticking forces for Examples 1 to 3 were less than 0.5 (kgf), while the sticking force for Comparative Example 1 was greater than 10 (kgf). Thus, addition of 5–20 parts by weight of the phosphite-based material to the acrylic rubber composition formed a reliable phosphorus inert coating on the soft-iron plates and effectively prevented sticking to the soft-iron plates. Addition of the phosphite-based material at 8 parts by weight or greater is more preferred.

TABLE 1

|  | Amount of phosphite-based material added (pts by wt) | Amound of acid acceptor added (pts by wt) | Sticking force (kgf) 140° C. × 100 h |
| --- | --- | --- | --- |
| Example 1 | 5 | 10 | <0.5 |
| Example 2 | 10 | 10 | <0.5 |
| Example 3 | 20 | 10 | <0.5 |
| Comparative Example 1 | 0 | 10 | >10 |

The anti-sticking effect obtained by the addition of the acid acceptor in Exhibits 4 to 8 and Comparative Example 2 is evaluated in Table 2, and is discussed in detail below.

The acid acceptor was added at 1 part by weight in Example 4, 2 parts by weight in Example 5, 3 parts by weight in Example 6, 5 parts by weight in Example 7 and 10 parts by weight in Example 8. An acrylic rubber composition containing no acid acceptor was also molded for Comparative Example 2 according to the same production method described above.

Examples 4–8

Comparative Example 2

The acrylic rubber compositions of Examples 4 to 8 and Comparative Example 2 were sandwiched between soft-iron plates and immersed in engine oil at 140° C. for 100 hours, 200 hours, 300 hours and 500 hours respectively in the same manner as Examples 1 to 3, upon which the sticking forces were measured with the same tension tester used above.

As shown in Table 2, the times required to reach 0.5 (kgf) in Examples 4 to 8 were longer than the time required in the Comparative Example. Thus, addition of the acid acceptor to acrylic rubber compositions at 1–10 parts by weight reduces the sticking force between the acrylic rubber compositions and the soft-iron plates for a long period of time. This is because the acid acceptor inhibits the acid function of the acidic substances, thus effectively preventing damage to the inert coating by the acidic substances, and preserving the inert coating on the surface of the soft-iron or other metal member over longer periods. It is therefore possible to obtain acrylic rubber compositions and prevent their sticking to metal members over long periods of time.

TABLE 2

|  | Amount of phosphite-based material added (pts by wt) | Amount of acid acceptor added (pts by wt) | Sticking force (kgf) | | | |
| --- | --- | --- | --- | --- | --- | --- |
|  |  |  | 140° C. × 100 h | 140° C. × 200 h | 140° C. × 300 h | 140° C. × 500 h |
| Ex. 4 | 10 | 1 | <0.5 | <0.5 | 0.5 | 0.7 |
| Ex. 5 | 10 | 2 | <0.5 | <0.5 | <0.5 | <0.5 |
| Ex. 6 | 10 | 3 | <0.5 | <0.5 | <0.5 | <0.5 |
| Ex. 7 | 10 | 5 | <0.5 | <0.5 | <0.5 | <0.5 |
| Ex. 8 | 10 | 10 | <0.5 | <0.5 | <0.5 | <0.5 |
| Comp. Ex. 2 | 10 | 0 | <0.5 | 0.6 | 1.5 | 5 |

What is claimed is:

1. An acrylic rubber composition which forms a phosphorus inert coating on a surface of a metal member when in contact with said metal member, comprising:

an acrylic rubber;

one or more phosphite-based compounds selected from the group consisting of tris-nonylphenyl phosphite, diphenylisooctyl phosphite and phenyldiisooctyl phosphite; and an acid acceptor which reacts with an acid substance, said acid acceptor being an imide compound.

2. An acrylic rubber composition according to claim 1, which comprises 4–20 parts by weight of said phosphite-based compounds and 0.1–20 parts by weight of said acid acceptor, based on 100 parts by weight of said acrylic rubber.

3. An acrylic rubber composition according to claim 1 which forms a phosphorus inert coating on a surface of an iron-based metal member when in contact with said metal member, wherein said composition comprises 8–20 parts by weight of said phosphite-based compounds and 1–10 parts by weight of said acid acceptor based on 100 parts by weight of said acrylic rubber.

* * * * *